(12) United States Patent
Guter et al.

(10) Patent No.: US 11,848,740 B2
(45) Date of Patent: Dec. 19, 2023

(54) SIGNAL BOUNCING LOCAL MESH NETWORK TO LOCATE ENTITIES IN REMOTE AREAS

(71) Applicant: Never Far Away, LLC, New Bern, NC (US)

(72) Inventors: Joshua Sergey Guter, Raleigh, NC (US); James Jeremiah Paul, Raleigh, NC (US)

(73) Assignee: Never Far Away, LLC, New Bern, NC (US)

( * ) Notice: Subject to any disclaimer, the term of this patent is extended or adjusted under 35 U.S.C. 154(b) by 420 days.

(21) Appl. No.: 17/115,756

(22) Filed: Dec. 8, 2020

(65) Prior Publication Data
US 2022/0182129 A1    Jun. 9, 2022

(51) Int. Cl.
*H04W 4/029* (2018.01)
*H04B 7/155* (2006.01)
*H04W 84/18* (2009.01)
*G01S 5/02* (2010.01)

(52) U.S. Cl.
CPC ........ *H04B 7/15521* (2013.01); *G01S 5/0289* (2013.01); *H04B 7/15514* (2013.01); *H04W 84/18* (2013.01)

(58) Field of Classification Search
None
See application file for complete search history.

(56) References Cited

U.S. PATENT DOCUMENTS

| 10,448,355 | B2 | 10/2019 | Reial et al. |
| 10,535,249 | B2 | 1/2020 | Cholhan et al. |
| 10,629,044 | B2 | 4/2020 | Pham et al. |
| 10,668,997 | B2 | 6/2020 | Moses et al. |
| 10,677,882 | B2 | 6/2020 | Chung |
| 2008/0266118 | A1 | 10/2008 | Pierson et al. |
| 2012/0086574 | A1 | 4/2012 | Blumel et al. |

*Primary Examiner* — Willie J Daniel, Jr.
(74) *Attorney, Agent, or Firm* — Brett A. Schenck

(57) ABSTRACT

A search and rescue (from hereon, SAR) optimization/prevention system is set forth, for ensuring the safety and connectivity of people in locations such as but not limited to national parks, hiking trails, mountains, lakes, rivers, forests, and other areas that do not receive (or receive inconsistently) reliable cellular, satellite, or GPS network connectivity. The mesh network system comprises wearable devices used by the person being located, and transceivers responsible for getting a signal from the user to a responder via the bouncing of a signal. Once a signal is received at a designated transceiver, the system may output information about the at least approximate location and condition of the user that transmitted the signal, including the approximate location, time of distress, and other pertinent data, based on information carried in the signal.

19 Claims, 6 Drawing Sheets

SIGNAL BOUNCING LOCAL MESH NETWORK TO LOCATE ENTITIES IN REMOTE AREAS

FIELD

This application is related to optimization of search and rescue (SAR) operations, and more particularly to the identification and locating of a person who is experiencing an emergency physical condition or locational disorientation, preventing the costly process of a large scale SAR operation. To be more descriptive, the device allows a person experiencing either of the two above conditions, or any other condition that might require external aid, to rapidly and reliably alert local responders in the area, and share current information with them such as location, duration of the emerging situation, and time since the last signal was sent. Other types of data that may be transmitted from a wearable device on the person could include current heart rate/pulse, type of emergency, confirmation that help is on the way or that a signal has been received, or any other desired functions within the realm of interpretable data. The system may comprise wearable devices used by the user, transceivers responsible for getting a signal from the wearable to a designated transceiver at a certain location in order to alert emergency response, safety personnel, or others. The system may also be used to relay other types of radio information or signals through low connectivity areas.

BACKGROUND

The lack of ability to get connected in certain areas of the world, despite the location's popularity, leads to emergency situations when someone needs to get in contact with safety personnel, emergency response, or others, and cannot. Search and rescue (SAR) operations can be described as the search for and provision of aid to people who are in distress or imminent danger. Every year approximately 5 million dollars are spent on SAR, yet hundreds of people go unfound, and hundreds of people die before being found. Events that can result in SAR operations in areas such as mountains and hiking locations include but are not limited to wandering away from marked trails, accidents such as falling off of a path, losing mobility due to an accident like a sprained ankle, and attacks from animals. SAR may also occur in areas like lakes, rivers, and beaches in which people may find themselves afloat with no easy way of getting back to dry land, due to events such as rip currents (a rapid current of water that quickly retreats away from land, pulling swimmers hundreds of meters from land), injury, sea animal attacks, rough water, inexperience in swimming, or other events. The time required for response to effectively save a person in a situation like this is extremely low, which is why most of these locations have designated teams patrolling the area. However, in 2018 alone, over 100 people still lost their lives in the United States of America in surf locations (beaches, coastal locations) alone.

When a person finds themselves in a situation that requires SAR, panic typically begins to set in, this is especially true in areas in which the person feels isolated, or disconnected. This can be caused by the lack of ability to be heard by people (being too far from a trail or populated area), lack of ability to contact people using traditional means such as a cellphone (lack of cellular service, ability to get to a cellular device), lack of ability to use or justify the cost of alternative methods such as GPS or Satellite phones (often have dead zones while satellites are orbiting Earth, as well), inability to return to a previous location due to physical emergencies like dehydration or injury, and other similar situations. Furthermore, many locations that require SAR are not ideal for general survivability, and many people are not extremely experienced in survival practices. All of this is to say, timing is extremely important when attempting to create a successful SAR operation that does not require large amounts of funds and other resources. Decreasing the time it takes for a person to communicate that they are in distress, and their location, decreases the time it takes for response teams to deploy and rescue the individual. Communicating the location of a distressed person allows responders to head directly to the situation, rather than spending (on average) 1600 dollars an hour on helicopter search teams, or endangering people by doing large ground based searches with human resources, emergency equipment, and dogs.

A system that connects people in these otherwise disconnected areas to help optimize, or prevent, large scale SAR operations would be extremely desirable. A system as described would decrease the response time to a distressed situation, increase the accuracy of responders efforts based on location, decrease the immense costs related to SAR, and generally provide a safer environment for people to enjoy exploration in disconnected areas.

In doing research for this patent application, several patents were discovered that utilized methods either too complicated, inefficient in certain areas, or otherwise inapplicable to the problem being solved utilizing our system. The first of which is U.S. Pat. No. 10,629,044, "Detecting Incapacitation and Locating Using Nodes". As the title might suggest, this patent covers technology that detects an event that could incapacitate a user, and then locates the user utilizing a plurality of nodes in a system. While this patent does cover the issue of locating someone who has been incapacitated, not all emergencies result in incapacitation. Take for instance a user that finds themselves lost in a high altitude with the weather quickly getting cold, and the sun beginning to set. While this user has not suffered an incapacitating event, they are likely going to be in serious trouble if they are not able to communicate their distress. The patent describes technology by Honeywell that fails to save this user. U.S. Pat. No. 10,677,882, "Interconnected System and Device for Outdoor Activity Group", allows for a user to communicate to their group that something has happened. This patent fails to address large issues, however.

Firstly, this patent describes a system of devices that are interconnected individually to a single outdoor activity group, meaning that the group can communicate with one another but outsiders may not be able to get information from this group. Furthermore, the entire system provides locations in reference to other devices inside of the system, but the entire system is mobile in the world coordinate system, meaning that there is no way to locate the systems' whereabouts in the real world without cellular or GPS signals, both of which are not reliable in many areas of the world. If a rescuer heard that a group went missing, they would not be able to locate the group utilizing this technology, and the group could not use this technology to communicate with a rescuer, ultimately leading to another unsaved individual(s). The issue of relying on signals that are not reliable in certain areas of the world plagued many patents in this space, specifically patent application 2012/0086574 A1, "Tracking and Alert Apparatus, System and Method", for instance.

This patent allows a user to notify distress, but relies on mobile (cellular) communication and GPS to help relay the signal, and get information about the location of the user. As mentioned, many locations throughout the world do not have reliable coverage from cellular and GPS signals, and this can result in a user not being able to be located, or communicate distress at all. In order to avoid this issue, one must consider routes that do not rely on external signals like GPS and Cellular.

U.S. Pat. No. 10,535,249 B2, "Emergency Notification Apparatus and Method" attempts to solve this by utilizing a plurality of nodes to communicate information. However, this patent, like many before it, relies on location information being transmitted from a device in the system. The method of the devices in this patent getting information about their location is not described, so it would be reasonable to assume that the devices must be located utilizing some sort of external signal, such as GPS or Cellular. Assuming that this is not the case, and that the system somehow knows the location of its devices through another means, the patent does not mention the utilization of any sort of wireless signals, therefore the system must be assumed to be interconnected utilizing some sort of hardware. Over large areas, some parks being as large as 100's of miles across, a hardware solution as described becomes extremely expensive, or altogether impossible to set up.

The patents described thus far all fail to utilize signals that are reliable, fail to be easily accessible and affordable, and all ultimately lead to situations that leave a user in grave danger. The last patent that dealt with the related space is U.S. Pat. No. 10,448,355, "Radio Location Technique". This patent describes a method of locating people utilizing radio signals, which is the first step to creating a system as described in our patent that can locate people utilizing local signals. However, this patent discusses an advanced method of radio locating utilizing data such as the direction that a radio signal has been received from, propagation directions. Furthermore, this patent describes a method to locate devices that are already in communication with these towers, implying the utilization of already existent radio/cellular towers that fail to reach certain areas of the world. This patent describes a method that is far more complex and that requires hardware not necessary to solve the problem of locating a user, and also relies on existing towers that may not be set up in an disconnected area.

While all of these patents serve their respective purpose on the mission to help locate distressed individuals, or track individuals for data collection in the case of the last patent, none of them cover the issues that can lead to a user dying due to situations such as lack of reception from cellular or GPS signals, overly costly products preventing users from utilizing the technology, and other above described issues.

SUMMARY

As currently stands, the present invention aims to decrease the scale of, cost of, and time spent on SAR operations. The system may include wearables, bouncers, and receivers that each include transceivers. The wearable devices transmit device information such as the device type, the device ID, and any other important information. Other versions of the wearable may transmit information such as physiological information like heart rate, body temperature or near body temperature, and other related information. Furthermore, other versions may allow for the user to communicate what sort of emergency they are experiencing, whether that be injury, disorientation, or any other distressing situations. The transceivers used to communicate the signal from user to safety officials, first responders, or other individuals, comprise two main types mentioned above, bouncers and receivers. A bouncer is responsible for receiving information from a wearable, or another bouncer, reading the data packet, concatenating its device information into the data packet if needed, and forwarding it via wireless transmission to the other bouncers/receivers in range. Other versions of the bouncers may be expanded to include features such as audible or visual confirmation of signals being received, and may bounce other radio based signal types. The receiver is responsible for receiving a signal, and outputting the data packet. The data packet may be outputted to an external system utilized to locate a user based on the data packet and an external database of information, and alert a safety official of their location. The external system may do this through the usage of a UI in an app, a GUI on the receiver itself, through audio or visual cues, or other methods depending on location and resource availability.

These devices work together to create a locally connected mesh network over areas that are typically disconnected, ensuring that people in these areas are still able to get in contact with emergency responders or others as needed, decreasing the response time to a distressed situation, increasing the accuracy of responders efforts based on location, decreasing the immense costs related to SAR, and generally providing a safer environment for people to enjoy exploration in disconnected areas. These, and other advantages of the present invention will be apparent from the detailed description taken with reference to accompanying digital drawings/graphics.

DETAILED DESCRIPTION

Figure 1:
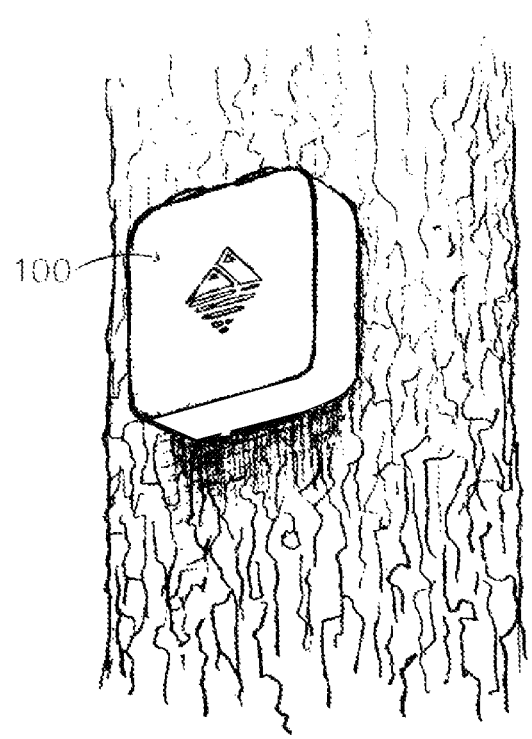
FIG. 1 is a sketch of a bouncer/receiver type transceiver attached to a tree, as it may be installed in certain areas.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term mesh network system refers to a system comprising multiple (typically three or more) devices that can communicate with one another locally over a certain area.

For the purposes of the present invention, the term transceivers refers to a device that can both receive and send signals For the purposes of the present invention, the term wearable refers to a device that is worn by the user that transmits signals to other devices.

For the purposes of the present invention, the term bouncer refers to a device that receives a signal, adds an identifying property to it if needed, and then forwards it to other nearby bouncers or receiver.

For the purposes of the present invention, the term receiver refers to a device that may be connected to an output device to allow a signal to be detected and read by safety personnel, emergency responders, or others.

For the purposes of the present invention, the term activation method refers to some method that allows the triggering of a wearable resulting in the sending of a data packet. An example would be the pressing of a button.

For the purposes of the present invention, the term data packet refers to a packet of information sent through the mesh network comprising different information such as device ID's, device types, a string of previous devices that have received the data packet, and other information.

For the purposes of the present invention, the term device ID refers to a string of characters that uniquely identifies a device in the mesh network.

For the purposes of the present invention, the term concatenation refers to the action of linking certain things together in a series.

For the purposes of the present invention, the term device information refers to device specific information such as device ID or device type.

For the purposes of the present invention, the term device data refers to information associated to the respective wearable, bouncer, or receiver, comprising, but not limited to, its device ID, its device type, and other important information.

For the purposes of the present invention, the term modified data packet refers to a data packet that has been received by other device(s) and transmitted with additional information concatenated into it.

For the purposes of the present invention, the term final data packet refers to a data packet that has reached a receiver.

For the purposes of the present invention, the term external system refers to a system that contains a list of device IDs and their physical locations, set respective to the network the specific system is handling.

For the purposes of the present invention, the term initial wearable devices location refers to the location of the initial transmitting device as determined by the most recent data packet received by the receiver.

For the purposes of the present invention, the term external server refers to an external system responsible for managing and processing data not stored on individual transceivers.

For the purposes of the present invention, the term triangulation refers to the process by which the location of a radio transmitter can be determined by measuring either the radio distance or direction of the received signal from 2 or 3 different points.

Description

Figure 3:
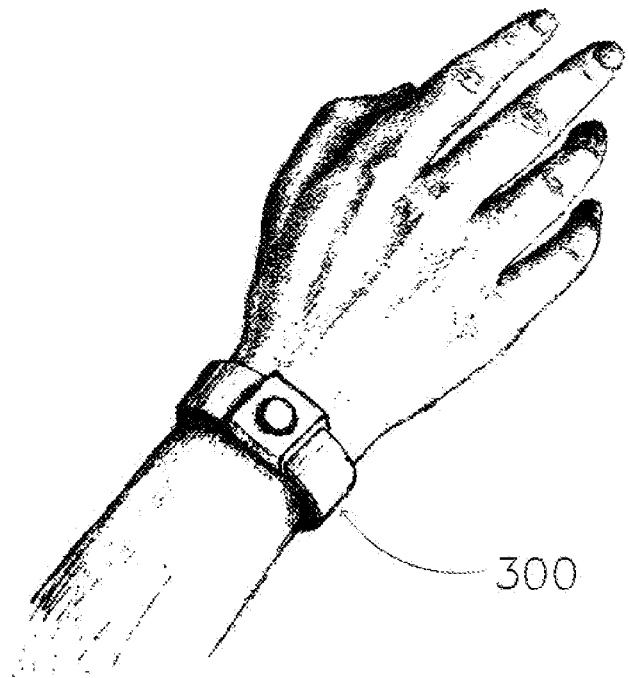
FIG. 3 is a sketch of the wearable device on a user's wrist, helping to visualize this example of a wearable device as it may be worn.
Figure 4:
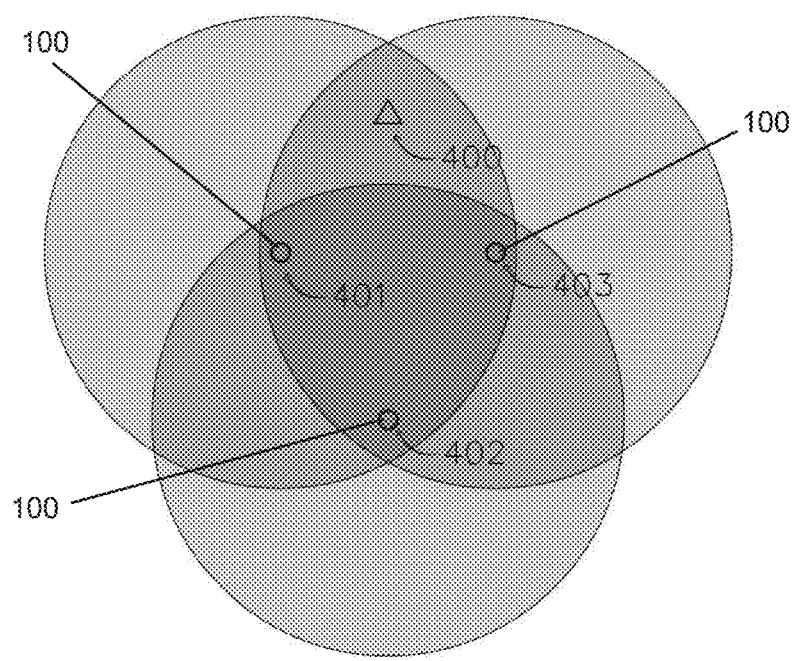
FIG. 4 is a zone map created by three bouncers, with a user's location represented on the map. Zones are represented by overlapping circles, with each overlap resulting in the circles color getting darker.
Figure 8:
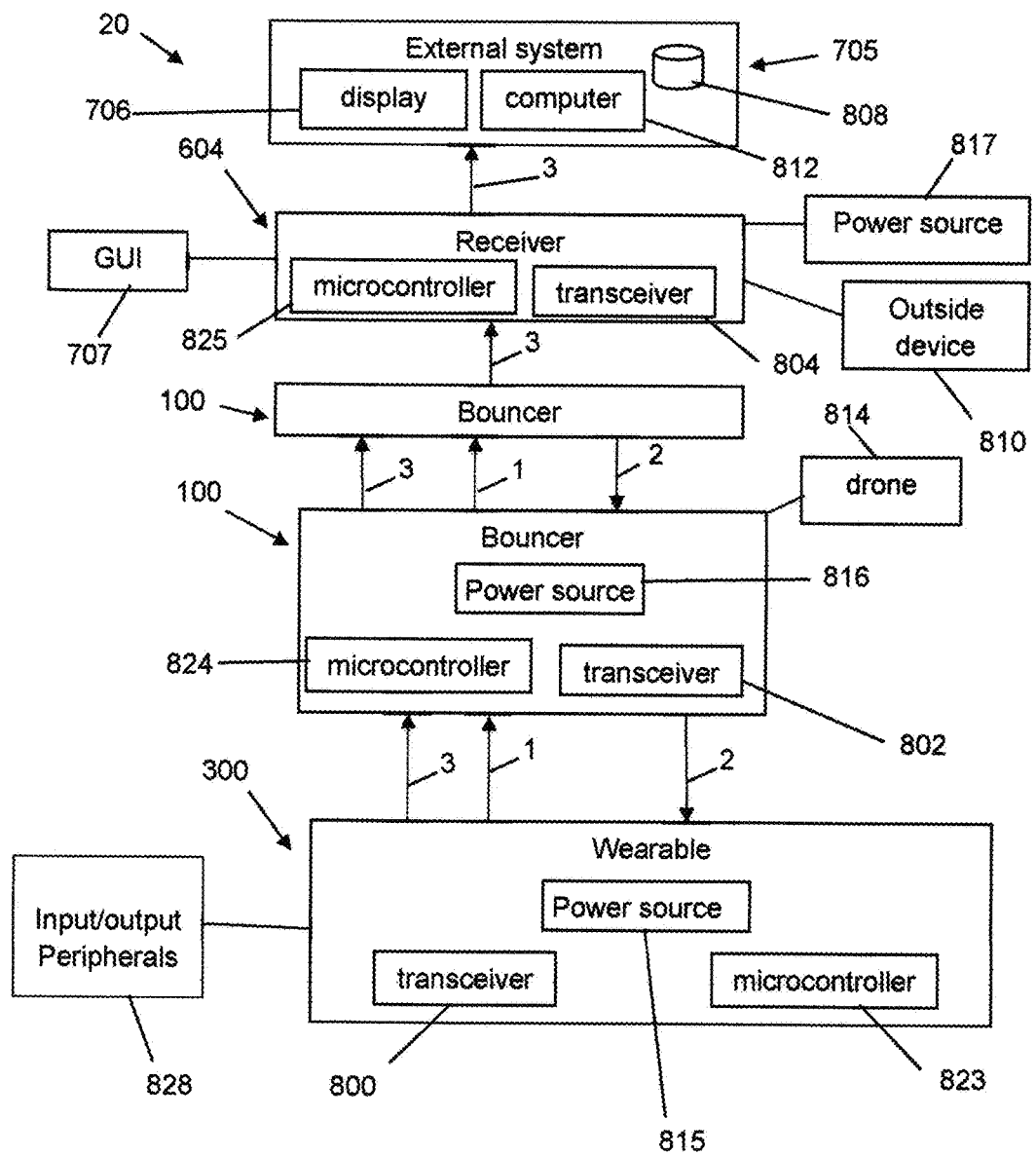
FIG. 8 is a block diagram of components of a portion of the system according to an embodiment of the present invention.

FIG. 8 shows one embodiment of a mesh network system 20 that is able to locate people in distress by using various forms of transceiver radio communication technology according to an embodiment of the present invention. The mesh network system includes a wearable 300, bouncers 100, a receiver 604, and optionally, an external system 705. The wearable 300 may be in the form of a wrist-worn (FIGS. 1 and 3), necklaces, articles of clothing, or any other reasonable form to be carried or worn by a user 400 (FIG. 4). The bouncers 100, the receiver 604, and the wearable 300 are weatherproof and configured to withstand interactions from an animal or a person.

Figure 2:
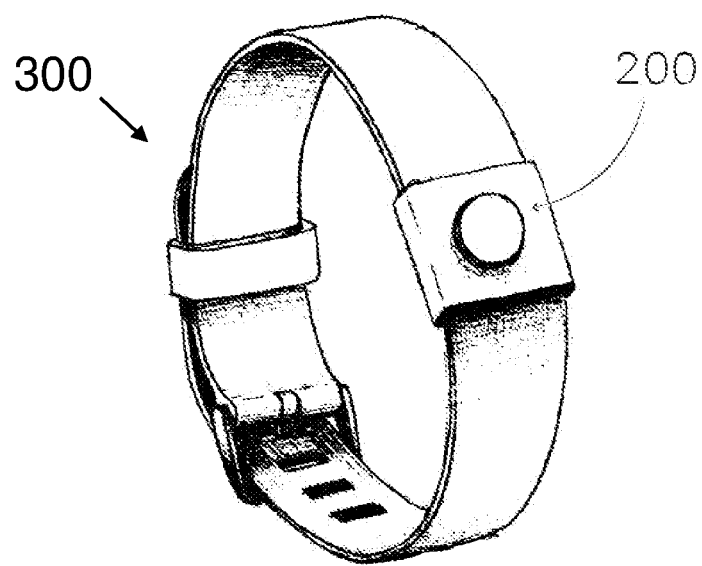
FIG. 2 is a sketch of a possible wearable device design with an built in activation method, in this case a button.

The wearable 300, bouncers 100, and the receiver 604 include specialized transceivers 800, 802, 804 in the form of LoRa chips that are capable of both sending and receiving wireless radio signals. In order to start sending signals, the transceiver in the wearable 300 typically relies on some sort of activation method. For most of the examples in this application, the pressing of a button 200 (FIG. 2) is the form of activation used, but activation methods and devices can alternatively comprise detection of some state using sensors (heart rate, temperature, contact with liquid), wireless activation from another device, and other methods of activation. Alternatively, instead of the transceivers, the system 20 may have transmitters and receivers to be separate stand alone components. Furthermore, the transmitters used in the system described utilize long range low power using communication technology, (such as LoRa developed by Semtech) that allow the devices to be able to send signals across great distances (over 3 kilometers, in some conditions). This is extremely useful in larger areas as described earlier, that do not receive traditional signals like Cellular or GPS.

Figure 6:
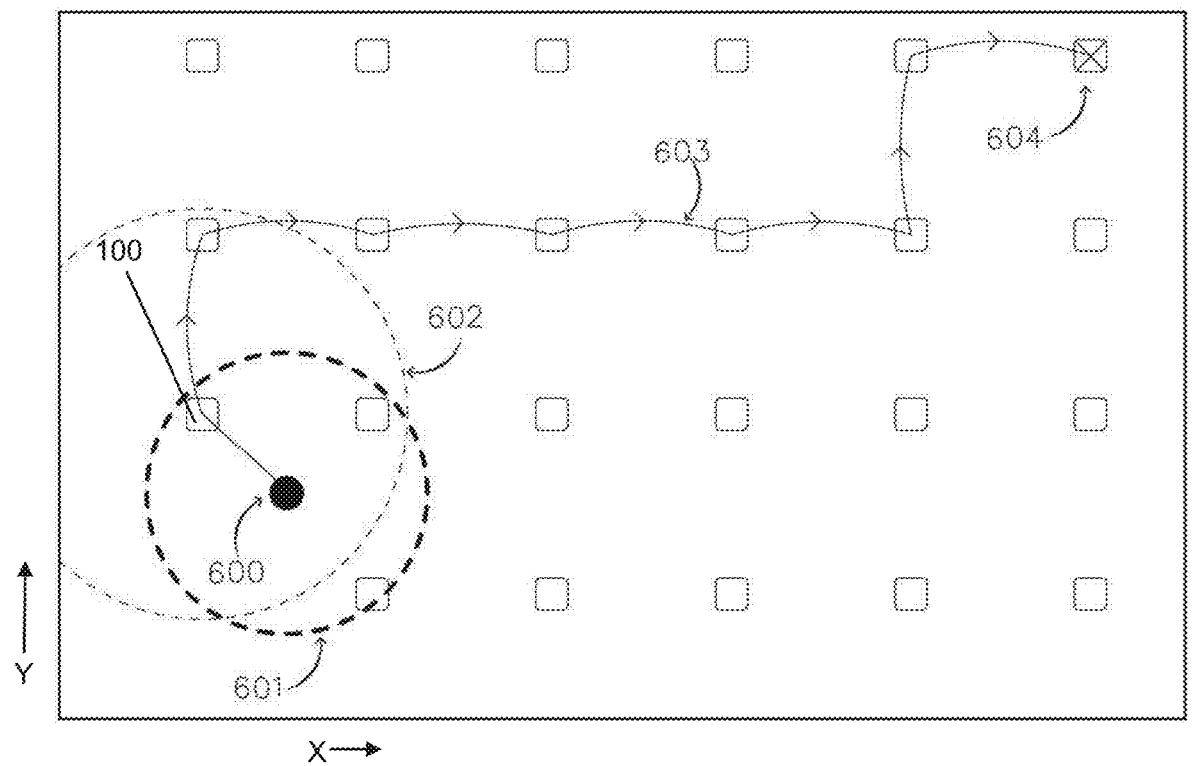
FIG. 6 is a top view of the system described in this work, with a graphical representation of a data packet making it from a user to a receiver.

The system 20 (FIG. 8) described utilizes these transceivers for three main purposes, the transmission of a panic signal, the 'bouncing' of a panic signal, and the reception of a panic signal. These three actions are completed by the transceivers for the wearables, bouncers, and receivers. The purpose of the wearable type transceiver is to get a panic signal from a user to the nearest bouncer 100 (FIG. 1) or receiver type transmitter 600 (FIG. 6). Considering this, the transceiver 800 in the wearable 300 can be manually activated to begin sending signals through the press of the button 200, for example. This signal, in an ideal world, would go straight to a responder with accurate location information attached. Unfortunately, signals do not have infinite range, and locating a device without the reliance of outside signals is impossible. For this reason, bouncers 100 are set up throughout an area that the wearable 300 is within range 601 of at all times. Due to the long range of the transceivers mentioned earlier, the bouncer type transceivers can be spread a reasonable distance.

In particular, when the bouncers 100 are set up as shown in FIG. 6, they are placed throughout an area that is enclosed by an approximate rectangle with width X and height Y, approximately. This rectangular area is oriented to true north based on the real-world coordinate system, and the (typically) bottom left origin coordinate is known in this coordinate system, and set to the value 0,0 in our back-end (typically the origin is set to be the location of the final receiver, the reasoning for this is given later). The top right corner has the value X,Y. Each bouncer 100 is manually placed, so that it is known approximately where it is in reference to the origin of the grid. This allows coordinates to be created for each bouncer 100. For example, in a rectangular area of 100×100 meters (a square in this case), if a bouncer 100 is set up to be 50 meters to the right of the origin, and 50 meters up, its coordinates would be 50,50 in the system 20. Assuming that there are three bouncers 100, one at 100,100, one at 50,50, and one at 25,25. Since the origin is set up at the final receiver, the location to get the packet is at the coordinate 0,0.

Using the coordinates of each bouncer 100 that are manually set, a variable is created that is specific to each bouncer 100 called the N value. The N value is calculated using the formula (((X Coordinate of Bouncer)/(Maximum X Coordinate)+(Y Coordinate of Bouncer)/(Maximum Y Coordinate))/2)*1000. Basically, each bouncer 100 gets a value between 0 and 1000 (in this exemplary embodiment, the code only use values 000-999 as to always have a three digit N value) based on its distance from the receiver, 1000 being farthest and 0 being closest. Each bouncer 100 has a different N value since they are all placed at different locations. In this example, one bouncer 100 would have an N value of 999 (not 1000 because only three digit N values area used), one would have an N value of 500, one would have an N value of 250. This information is sent by bouncers 100 when a panic signal is received.

The embodiment of the present invention has three common signal types. These signal types are indicated by the reference numbers 1, 2, and 3. The first signal 1 (type 1 signal) is a general panic signal typically sent from a wearable. When a bouncer 100 receives the first signal 1, it checks the signal type, and if it is a signal type 1, responds by sending via the transceiver 802 a second signal 2 with its N value included. The wearable 300, after sending the first signal 1, waits for at most three second signals 2 (type 2 signals) from the bouncers 100 within the range of the wearable 300 to be received, and ignores other signal types. When a second signal 2 is received by a wearable 300, the wearable 300 temporarily stores the N value attached to those signals for comparison. Once the wearable 300 sorts through the N values and chooses the one closest to 0 (as it is known that 0 is where the signal is headed), the wearable 300 sends out a third signal 3 (type 3 signal) with that N value attached, and a short array of the N values initially received (so that the backend receiver can see what three bouncers 100 were close to the bouncer 100, and approximate location based on that information). When a bouncer 100 receives the third signal, it knows to compare the N value on that signal to that of its own, and if they match, the bouncer 100 will repeat the process starting with a new type 1 signal sent to another group of bouncers 100 or the receiver 604 (if there are no more bouncers 100 en route to the receiver 604). If they don't match, the signal is ignored. The wearable 300 does not respond to type 1 signals.

In essence, when a bouncer 100 receives the first signal of type 1 from the wearable 300, it knows that the wearable 300 is requesting information around it. Therefore, the bouncer 100 responds with a second signal (type 2 signal) containing the signal type, and the N value of the bouncer 100. Each bouncer 100 sends this data using the transmitter portion of the transceiver hardware. All of this processing is handled by extremely small microcontrollers 824 in the bouncers 100 and microcontrollers 823 in the PCB of the wearable device 300, which microcontrollers manage the transceivers (LoRa chips) 802, 800 (FIG. 8) that sends and receives wireless signals. The microcontrollers 823, 824 help to control on board components like the transceivers (wireless chips) 800, 802 and input/output peripherals 828 like the buttons. The only 'outside' component that is utilized is an external power source 815 (FIG. 8) such as a battery or solar panels to power the wearable 300. External power sources 816, 817 may also be provided to power the bouncer 100, and receiver 604, respectively. Microcontroller 825 is provided in the receiver 604 to manage a transceiver 804 (LoRa chip) in the receiver 604.

The wearable 300 waits for a predefined amount of time to hear back from nearby bouncers 100, and once this period ends, the wearable 300 goes into an internal processing mode to compute the gathered information. In the case that no information was received, the wearable 300 continues to send signals, seeking a response. The internal processing portion of this process focuses on sorting and comparing the received bouncers' information to figure out which bouncer 100 is the closest to the receiver 604. The wearable controller 823 does this by sorting through information provided to it by the bouncers 100, and analyzing it. The information provided enables the wearable 300 to determine which bouncer 100 is best to send a signal to.

The wearable 300 determines which bouncer 100 is best to send a signal as follows. The wearable 300 collects up to three type 2 signals, that contain N values. The wearable 300 stores these N values in a small array, and then does a basic comparison of the three N values and determines which one is the closest to 0. The wearable 300 then sends out a type 3 signal alerting the bouncer 100 with that N value that it needs to repeat the process. This determination is handled by the transceivers on-board microcontroller. Before sending the signal, the wearable 300 stores up to three of the responding bouncers' information into the data packet for use in the external system as described above. The bouncer 100 sends this data packet 700 with an identifier attached that is specific to the bouncer 100 it determined was best to send to (i.e. the bouncer 100 in the group of two or three bouncers that received the type 1 signal that is closest to the receiver 604). Once this bouncer 100 gets the signal containing the data, the bouncing process begins.

Summarizing this, the first purpose of the bouncer 100 is to 'bounce' a signal through a network to a receiver. The bouncer 100 then acts as a relay that can choose the best route to a receiver, and has fail safes built in in the case that a bouncer 100 on the route is out of commission (since route determination is based on N value, not specific bouncers 100, it can dynamically find new ways to get a signal from a remote area to a receiver, even if the 'best route' isn't available).

The second purpose of a bouncer 100 is to help locate the user. Due to the nature of the bouncers 100 being placed at specific locations throughout an area, the data packet 700 that is transmitted from the wearable 300 also contains information about which bouncers 100 were in range of the wearable 300 at the start of the process. The wearable's initial activation is completed by an activator, which may be a button or alternatively other suitable devices such as impact sensors, temperature or heart rate sensors.

As previously mentioned, once the wearable 300 is active, it sends out its first signal (type 1) requesting what bouncers 100 are nearby (type 1), bouncer 100 respond by sending a second signal (type 2), and a wearable 300 sends its confirmation signal (type 3). All of this happens on its own (automatically) after the initial activation.

As mentioned, signals do not have infinite range. The transceivers 800, 802, 804 in the respective devices, therefore, serve two purposes. The first of which is to serve as a way to get a signal from a user that is otherwise unable to get to a receiver, to a receiver. This is done through the strategic placement of the bouncers 100 as illustrated in FIG. 6, so that each bouncer 100 can communicate with at least one other within their overlapping range 602, and software that allows the bouncers 100 to route the data packet 700 sent from the wearable 300 to the receiver 604. A bouncer 100 receives the data packet 700 from a wearable 300, and then sends that data packet 700 to another bouncer 100 that is positioned en route to the receiver 604, and that bouncer 100 does the same sending the data packet 700 to the next in route 603, and this process repeats until the data packet 700 makes it to the receiver 604. The second purpose is that due to the nature of the bouncers 100 being placed at specific locations throughout an area, the data packet 700 that is transmitted from the wearable 300 also contains information about which bouncers 100 were in range of the wearable 300 at the start of the process. This information is later used by a backend system to calculate, and communicate, the likely location of a user.

The transceivers 800, 802 of the wearable 300 and the bouncers 100 work together to deliver important information to the final transceiver 804 of the receiver 604. The receiver type transceiver 804 is responsible for getting the data packet 700, and outputting it in some way, for instance, to an external system 705. The methods of output comprise outputting directly to some sort of graphical user interface (GUI) 707 attached to the receiver, outputting to a GUI located on another system, or outputting to the external system 705, or other methods of output. In the case that the data is outputted directly to the GUI 707, the person receiving the data would be responsible for interpreting the information and using it to predict the location of a user. The receiver 604 may output the data packet 700 to an outside device 810 for viewing the data. The outside device may include a handheld device, a cell phone, a personal computer, or any other suitable device. Preferably, the data packet 700 is outputted to the external system 705. The external system 705 takes the information received and uses it in conjunction with a premade database of bouncer locations and ranges to create a 'zone map' (FIG. 4) that is used to graphically represent the at least approximate location of a user, and could output a starting point for a search and rescue based on this.

Figure 5:
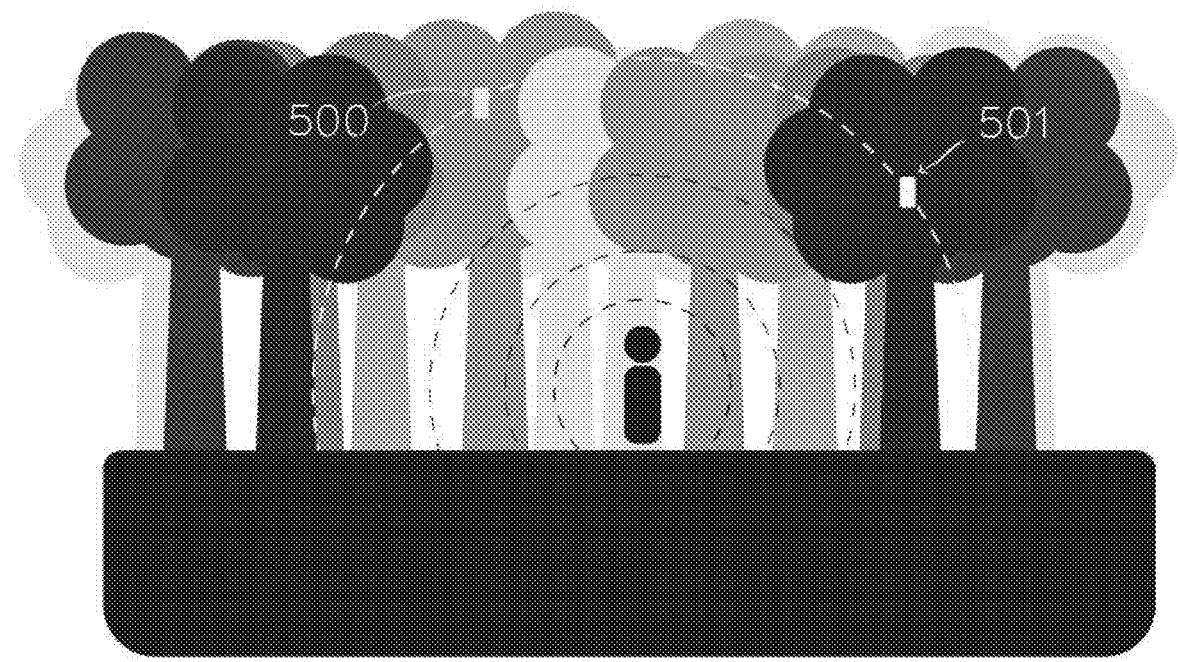
FIG. 5 is a user standing near bouncers in an outdoor area, activating a wearable device. Signals are shown propagating outwards until intercepting 2 bouncers, in this example.

To help clarify the three types of transceivers further, consider the following example as shown in FIG. 5. A user realizes that they have wandered off of a trail, and are not sure as to how to get back to the trail. They attempt to yell for help, but realize they are out of the audible range of any other person(s). They check their phone as a last resort to call for help, and realize they do not have access to cellular data. At this point, they activate their wearable 300 that then transmits a type 1 signal to nearby bouncer type transceivers set up at locations 500, 501 in the park. The signal is received by bouncers 100, and the bouncers 100 respond by sending type 2 signals to the wearable 300 thereby allowing the wearable 300 to know what bouncers 100 are nearby.

Figure 7:
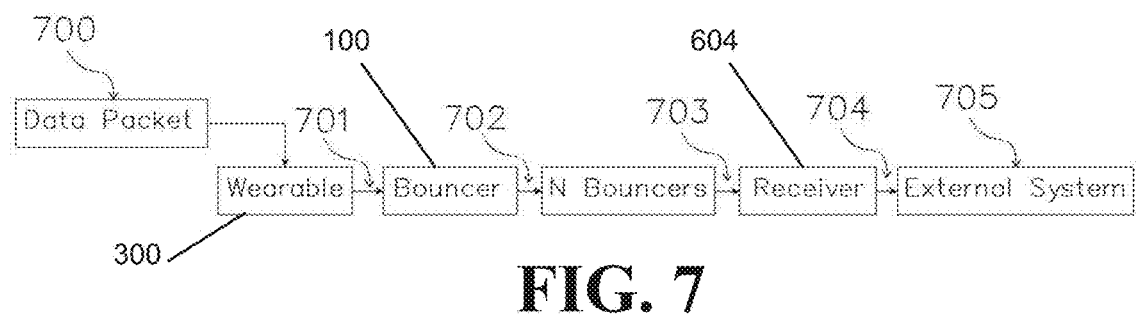
FIG. 7 is a process flow chart showing what parts of the network a data packet goes through during the process of making it to a receiver, and furthermore, an external server.

Referring to FIG. 7, the wearable 300 then sends a type 3 signal that contains information in the data packet 700 about what bouncers 100 are nearby, and this signal is marked for delivery to receiver 604. The bouncers receive this signal, and begin bouncing it from bouncer to bouncer as indicated by arrow 702. This continues until the signal makes its way to the nearest receiver 604 as indicated by arrow 703. The signal is eventually received by the receiver 604 and outputted as indicated by arrow 704 to an external system 705 running on a computer 812 (or a GUI, for example) that a responder is nearby or monitoring. The external system 705 uses the information in the data packet 700 to draw an overlap map displayed on a display 706 (FIG. 8) showing the location of the user in the area covered by the system 20. FIG. 4 illustrates an exemplary embodiment that considers two bouncers 100 positioned at locations 401, 403 such that the bouncers 100 have overlapping ranges. The computer 812 of the external system 705 can utilize this information, and the knowledge of which bouncer 100 responded, to produce an approximate location of a user 400. If the user were to move into the overlap zone of another bouncer 100 positioned at location 402 the approximate location of the user would update accordingly. The overlay map produced from this information may be placed on satellite imagery making it easy for a responder to identify a person's location, and coordinates representative of the users likely location are outputted by the system 20, as well. With this information, responders are able to know that someone is in trouble, and head directly to their location.

Examples of wearables 300 as described comprise bracelets, articles of clothing, ankle bracelets, necklaces, easy to carry forms like keychains, and any other reasonable form that may be easily worn or carried by a user. Specialized wearables may also be available for use that could include additional features such as a heart rate monitor, thermometer, altimeter, barometer, photosensitivity capabilities, and more. These sensors could be utilized to provide the responders with more information about a user's condition, or may be used as a way to trigger the transmission of a signal (for instance, if a heart rate monitor detected an unusually high or low heart rate from someone on a trail).

The wearables 300, bouncers 100 and receivers 604 that are set up throughout an area are subject to a variety of different conditions such as difficult accessibility, severe weather conditions like high heat or high winds, water presence, interactions with small animals, and more. Considering this, there are many different design considerations that the final bouncer/receivers may take on, on top of their base functionality as described above. Two examples of design considerations that may be made for these devices comprise the following. Bouncers 100 and receivers 604 may be equipped with methods of charging themselves through renewable means like wind and solar, for instance, bouncers may have small solar panels on top of them to collect solar energy. Bouncers 100, receivers 604, and wearables 300, may be designed to withstand severe weather, utilizing design choices like insulated and waterproof casings, impact ready casing, specific color choices to help prevent tampering with, and other similar design decisions.

It is assumed that all of these devices will utilize base components comprising a power source, a microprocessor or microcontroller, PCB's to help manage hardware, activation methods such as buttons, and a transceiver to send and receive signals, or any other necessary base hardware for the functions described. The power sources may be rechargeable in some cases as mentioned above, and the physical size and shape of components will likely vary between the bouncer/receiver type transceivers and the wearable type transceiver due to the dependency of the wearables on being worn or carried by the user, while the bouncers/receivers are dependent on their ability to withstand natural forces.

Figure 9:
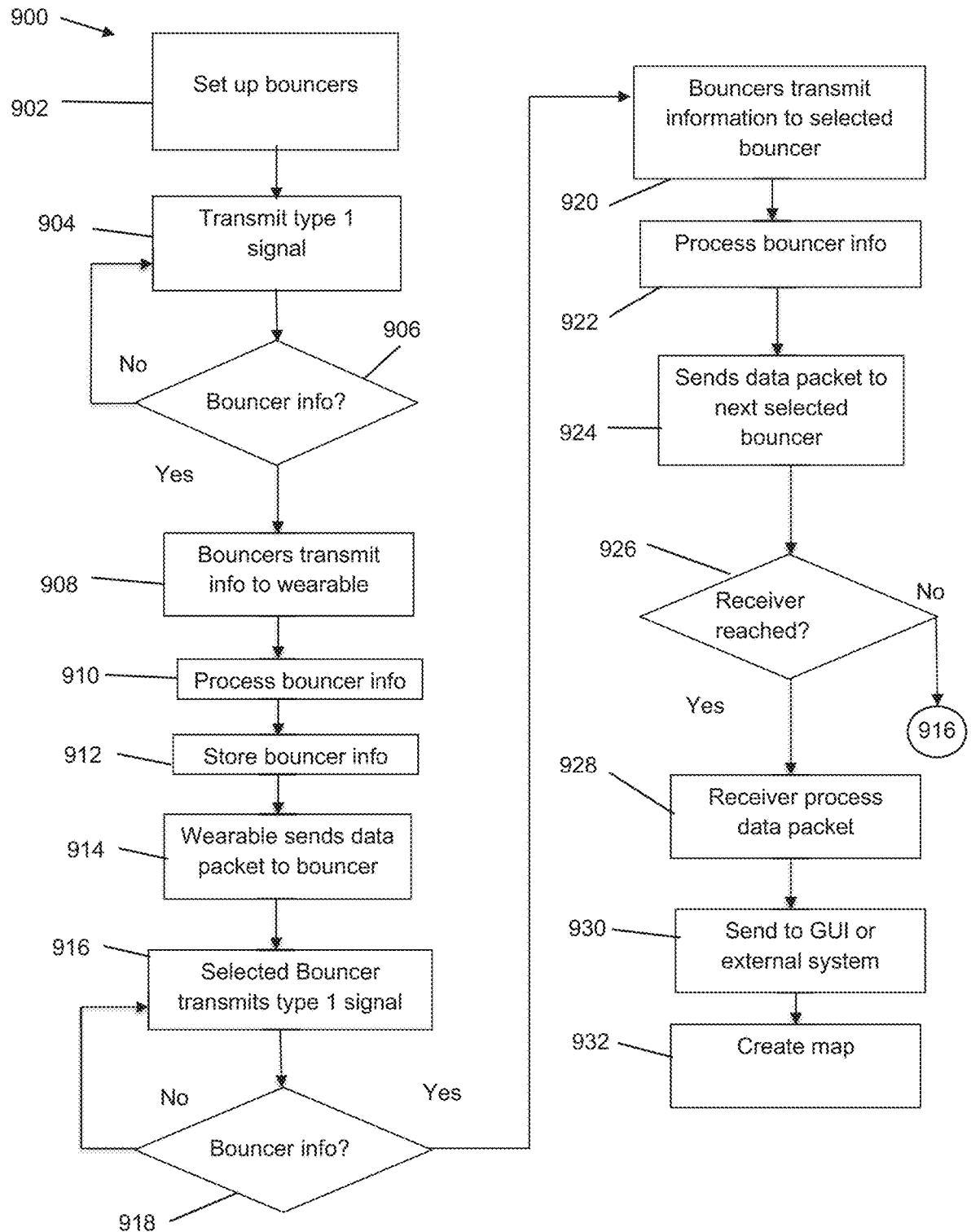
FIG. 9 is flow diagram of an exemplary method of operating the system according to an embodiment of the present invention.

With reference now to FIG. 9, an example methodology is illustrated and described for operation of the mesh network system 20 in which a distressed user can communicate his or her location to a long distance person. While the methodology is described as being a series of acts or steps that are performed in a sequence, it is to be understood that the methodology is not limited by the order of the sequence. For instance, some acts or steps may occur in a different order than what is described herein. In addition, a step may occur concurrently with another step. Furthermore, in some instances, not all steps may be required to implement a methodology described herein.

Moreover, the steps or acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodology may be stored in a computer-readable medium, displayed on a display device, and/or the like.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

In order for the system and its components to be able to communicate effectively, each device may be programmed with the same coding logic. The code may only differ when setting certain device specific variables. The code could be run through any microcontroller or microprocessor to control transceivers and other electrical components connected to them. The code may tell the transceiver what messages to send to other transceivers and allow the microcontroller or microprocessor to understand messages that have been received.

In step 902, the bouncers 100 are set up as previously mentioned. In step 904, the transceiver of the wearable transmits a type 1 radio signal requesting information from nearby bouncer type transceivers 500, 501. The wearable waits for a predefined amount of time to hear back from any nearby bouncers 100 in step 906. In the case that no information was received, the wearable will continue to send type 1 signals, seeking a response. When bouncers 100 within range of that type 1 signal get this request, they respond by transmitting their own information back to the wearable 300 in step 908. Once this period ends, the microcontroller of the wearable 300 goes into an internal processing mode to compute the gathered information.

The internal processing portion of this process focuses on sorting and comparing the received bouncers' information to figure out which bouncer 100 is the closest to the receiver 604 in step 910. The wearable microcontroller 823 does this by sorting through information provided to it by the bouncers 100 and analyzing it. The information provided enables the wearable 300 to determine which bouncer 100 is best to send a type 3 signal to as previously mentioned. Before sending the type 3 signal, the wearable in step 912 stores up to three of the responding bouncers' information into the data packet 700 for use in the external system 705 as described above. The wearable 300 compares the received information to choose the best route. For example, the wearable 300 may choose to send the type 3 signal to the nearest bouncer 100 to the wearable 300. In step 914, the wearable sends the type 3 signal containing the data packet 700 to the bouncer 100 in the group that is closest to the receiver 604. The wearable 300 sends this packet 700 with an identifier attached that is specific to the bouncer 100 it determined was best to send to as indicated by arrow 701 (FIG. 7). Once this first selected bouncer 100 gets the signal containing the data, the bouncing process begins.

In step 916, the first selected bouncer 100 receives the type 3 signal and starts the same process that the wearable used starting with sending out a type 1 signal request to all of the nearest bouncers 100 for their information. The first selected bouncer 100 waits for a predefined amount of time to hear back from any nearby bouncers 100 in step 918. In the case that no information was received, the wearable will continue to send signals, seeking a response.

Again, the bouncers 100 that get this type 1 signal then respond to it by sending a type 2 signal having their respective device information to the first selected bouncer 100 in step 920. Again, a short amount of time passes as the first selected bouncer 100 awaits responses, and then the first selected bouncer 100 goes into the internal processing loop with the collected data in step 922. In this step, the first selected bouncer 100 once again uses the information provided to determine the bouncer 100 in that group that received the type 1 signal that is closest to the receiver 604 for the type 2 signal to go to. Since the data packet 700 that the first selected bouncer 100 already has contains all of the data that the receiver 604 needs, the bouncer 100 doesn't have to add anything new to the data packet 700, and sends it to the bouncer 100 that was determined to be closest en route to the receiver 604 in step 924. This bouncing process depicted in steps 916, 918, 920, 922, and 924 is repeated as illustrated in step 926 for the selected bouncer 100 to next selected bouncer 100 closest en route to the receiver 604 until the signal packet reaches a receiver 604.

Eventually, the data packet 700 is received by the receiver. The code in the receiver goes through the received packet to pull any important information included (such as the wearable ID and the information collected from the original three bouncers 100, for instance). The receiver 604 may then print this information to some form of readable GUI 707 to show the important information to a responder. Furthermore, the receiver 604 may be capable of sending this information to the more complex backend external system 705 to process the data 704.

The backend external system may work by having access to a database 808 of information that may contain bouncer locations (as they are physically placed and their locations are recorded during set up), information about who is using what wearables, and other information as needed. Using the information provided to it by the receiver 604, the backend external system 705 indexes the database of bouncer locations to locate the bouncers 100 whose data are included in the data packet 700. The backend then indexes information about the range capabilities of each respective bouncer 100. Utilizing both of these data points (location and range of the bouncers 100 the wearable 300 was in contact with), the backend creates a map in step 932 showing transmission ranges of the three bouncers 100 and indicates which overlap zone created by these ranges the wearable signal originated from, as seen in FIG. 4. The backend may export this information graphically to a GUI, in the form of real world coordinates, or in other reasonable and understandable formats. This information is used by SAR personnel to get to the troubled user.

A key aspect of the code used in the system's devices, including the wearable, bouncer, and receiver type transceivers, may be that the code can be almost the exact same in each device type. The only things that vary in the code are device specific variables, such as ID or transceiver type, for instance, allowing the devices to be set to function as wearable, bouncer, or receiver type transceivers. This means that the code running in any of the systems hardware can be adjusted to a different setting at any time by changing a few variables, enabling rapid network maintenance and changes (imagine a pre-existing area adds a new section to its existing area, and more devices need to be added to the system, for instance). Furthermore, when manufacturing products for this system, the code may be quickly injected onto the hardware without requiring manual code writing per device, making the systems devices' manufacturing process scalable for larger areas. The code is constructed on foundations protected by several failsafes, and is created in a scalable way, helping to ensure that no situation results in a person being far away from help.

The mesh network system may further include the following additional features. The bouncers 100, the wearable 300, and the receiver 604 may be able to time the response rate of devices that receive their transmitted signals and use the timed response rates of the devices upon receiving their transmitted signals to more accurately determine the location of a user. The receiver 604 may send signals to the wearable 300 through the bouncers 100 to enable manual tracking of the wearable 100 without activation of the push button 200. The mesh network system 20 may include one or more drones 814 (FIG. 8) outfitted with specialized transceivers used to locate users that have wandered out of range of the traditional transceivers, if a situation of that description were to arise. The bouncers 100, receivers 604, and wearables 300 may be configured to visually match the surrounding environment. The bouncer 100 and wearable 300 may be configured to vary the power level to adjust range of transmission of the signals to more accurately locate the user. The bouncers 100 and/or the wearable 300 may be configured to emit an audible noise to help rescuers locate a user. Also, the wearable 300 may send the third signal directly to the receiver instead of through bouncers 100, so that no bouncing of the signal through the bouncers 100 occurs. The mesh network system 20 may transmit different signals such as radio communication, cellular, or other similar signals, throughout itself. The mesh network system 20 may be implemented on a smaller scale, to track pets, children, or others in varying areas such as residential spaces or recreational areas.

Use Cases

When considering the network as described above, it becomes immediately apparent that there are many different applications for it. Locations that are currently disconnected from reliable access to cellular networks, GPS systems, Satellite systems, or prevent the usage of devices that allow people to tap into these networks, are emergencies waiting to happen. These types of locations could utilize the described system to insure connectivity of visitors to safety officials, emergency responders, and others. Examples of areas that would benefit from the utilization of the described system include state parks or national parks such as Joshua Tree National Park in California, Hanging Rock State Park in North Carolina, and other similar locations. Every year, many hikers find themselves lost, disoriented, injured, or otherwise distressed at state and national parks due to various situations. Oftentimes these hikers spend extended periods of time without the ability to get in contact with responders due to inaccessible to reliable communication methods. These parks tend to be protected areas that do not allow for the construction of large complexes like cell phone towers that get people connected to larger networks, or are simply difficult to get various signal types to. Due to this, these areas are typically cellular dead zones for an average visitor. Furthermore, devices that utilize GPS and Satellite technology are too expensive for a common day visitor to justify purchasing, and may also struggle with reliable reception. The small size and lack of physical connection requirements between transceivers in the described system enables the system to provide protection to these areas, ensuring guest safety without interfering with regulations like those that prevent the installation of large towers, for instance. Furthermore, the parks described can be extremely large. The long range properties of the system 20 described make it an appealing option to cover large amounts of area that would otherwise be dead zones to other communication methods.

Other examples of areas that would benefit from the utilization of the described system include private hiking trails, paths, and other explorative spots. Oftentimes privatized areas such as hiking trails do not have a service dedicated to making sure everybody is safe in the areas that they go through. The system described will allow people to be connected to some sort of emergency service, whether that be the local emergency responders for the area, owners of the trail, or others, ensuring that an emergency on a smaller trail would not end in disaster due to the lack of ability to call someone and describe one's location effectively.

Other examples of areas that would benefit from the utilization of the described system include lakes, rivers, and beaches. When swimming, boating, kayaking, or participating in other water based activities, participants often do not have ready access to devices that can connect them to safety officials. With ample waterproofing planned, and methods of transmitting signals in water based areas, the system described would be vital to ensuring that a person experiencing an emergency situation in one of these areas would immediately be able to notify safety officials, ensuring that help can be sent before it is too late. The time frame for saving a person that is in trouble in the water is often multitudes less than that of the time available for an on land emergency. Therefore, utilizing a method of quickly contacting responders is extremely important in getting an ample response to an water based emergency.

Other examples of areas that would benefit from the utilization of the described system comprise Mountain tops, skiing/snowboarding based applications. Oftentimes inexperienced mountain goers find themselves off of a trail and disoriented, in physical distress due to an injury or situations like dehydration and/or hypothermia, or caught under snow due to events such as avalanches and falling into tree wells.

These areas are plagued by many of the issues that state and national parks were described as having, preventing the easy communication of distress to responders. The described system could help these people communicate their distress, and help responders find them in situations where a loss of life, or extended distress, is a typical outcome.

Other uses for the described system comprise pet monitoring, monitoring of children in a community, monitoring location on cruise ships or other ships that travel to disconnected regions, locational monitoring underground or in areas that have structures interfering with typical communication methods, and other applications that require a more reliable communication method.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A mesh network system for connecting a user to an outside group comprising:
   a wearable device, wherein the wearable device is associated with the user, wherein the wearable includes an activator;
   a first bouncer, wherein the activator is operative to cause the wearable device to transmit a first signal that is received by the first bouncer; and
   a receiver, wherein the first bouncer is operative to transmit a second signal that is received by the receiver in response to the first bouncer receiving the first signal, wherein the second signal includes data associated with the first bouncer that is used by the receiver to determine the at least approximate location of the wearable device, wherein the second signal contains information from the first signal sent by the wearable device when activated, wherein the receiver is in operative connection with either an external system or a graphical interface, wherein the receiver is operative to send the second signal to either the external system for outputting the at least approximate location of the wearable device based on the data from the second signal or the graphical interface for outputting the at least approximate location of the wearable device based on the data from the second signal to determine the location of the person via the bouncer.

2. The mesh network system of claim 1, wherein the first bouncer is from a first group of bouncers, wherein the first group of bouncers receive the first signal, wherein each of the first group of bouncers transmits a third signal to the wearable device in response to receiving the first signal, wherein the third signal includes data on the location of the respective bouncer, wherein the wearable device is operative to determine that the first bouncer is the closest bouncer from the first group to the receiver in response to receiving the third signals from each of the bouncers of the first group, wherein the wearable device is operative to transmit the second signal to the first bouncer, wherein the first bouncer is operative to transmit the second signal that is received by the receiver in response to receiving the second signal from the wearable device.

3. The mesh network system of claim 2 further comprising a second group of bouncers, wherein the first bouncer is operative to transmit the second signal to the second group of bouncers, wherein each of the second group of bouncers transmits a fourth signal to the first bouncer in response to receiving the second signal, wherein the fourth signal includes data on the location of the respective bouncer, wherein the first bouncer is operative to determine that a second bouncer is the closest bouncer from the second group to the receiver in response to receiving the fourth signals from each of the bouncers of the second group, wherein the first bouncer is operative to transmit the second signal to the second bouncer.

4. The mesh network system of claim 2, wherein the receiver sends the second signal to the external system, wherein the external system comprises a database of locations of the bouncers, wherein the external system compares the data associated with the first bouncer that is used by the receiver to determine the at least approximate location of the wearable device with the database of locations of the bouncers in response to the external system receiving the second signal, wherein the external system comprises an output device that outputs the at least approximate location of the wearable device based on comparing the data associated with the first bouncer that is used by the receiver to determine the at least approximate location of the wearable device with the database of the locations of the bouncers in response to receiving the second signal.

5. The mesh network system of claim 2, wherein the bouncers use triangulation to better determine the at least approximate location of the wearable device.

6. The mesh network system of claim 2, wherein the bouncers, the wearable device, and the receiver are able to time the response rate of devices that receive their transmitted signals and use the timed response rates of the devices upon receiving their transmitted signals to more accurately determine the at least approximate location of a user.

7. The mesh network system of claim 2, wherein the receiver is operative to send signals to the wearable device through the bouncers to enable manual tracking of the wearable device without activation of the activator.

8. The mesh network system of claim 2, wherein one of or any combination of the wearable device, the bouncers, and the receiver are powered by a solar or wind power source.

9. The mesh network system of claim 2 further comprising one or more drones, where the one or more drones include a transceiver to help locate the user.

10. The mesh network system of claim 2, wherein the receiver is operative to send the second signal to the external system, wherein the external system outputs data from the second signal onto a map with pre-generated bouncer locations in response to the external system receiving the second signal, wherein the second signal includes information on each bouncer from the first group of bouncers, wherein the at least approximate location of the wearable device is determined based on the information on each bouncer from the first group of bouncers.

11. The mesh network system of claim 2, wherein one of or any combination of the bouncers, receivers, and wearables are configured to visually match the surrounding environment.

12. The mesh network system of claim 2, wherein the bouncers are placed in a rectangular area, wherein a location of each bouncer is identified by coordinates based on a real-world coordinate system.

13. The mesh network system of claim 1, wherein the graphical user interface is in operative connection with the receiver, wherein the receiver transmits the second signal to the graphical user interface, wherein the graphical user interface outputs the at least approximate location of the wearable device based on the data associated with the first bouncer that is used by the receiver to determine the at least approximate location of the wearable device.

14. The mesh network system of claim 1, wherein the receiver outputs the data in the second signal to an outside device for viewing the data, wherein the outside device comprises one of a handheld device, a cell phone, and a personal computer.

15. The mesh network system of claim 1, wherein the first bouncer and wearable device are configured to vary the power level to adjust range of transmission of the signals to more accurately locate the user.

16. The mesh network system 1, wherein one of the first bouncer and the wearable device or both the first bouncer and the wearable device are configured to emit an audible noise to help rescuers locate a user.

17. The mesh network system 1, wherein the first bouncer, the receiver, and the wearable device are weatherproof and configured to withstand interactions from an animal or a person.

18. The mesh network system of claim 1, wherein the second signal includes an identifying property added by the bouncer to the first signal.

19. The mesh network system of claim 1, wherein the receiver is located at a distance that is in range to receive the second signal but out of range to receive the first signal.

* * * * *